(12) United States Patent
Evans

(10) Patent No.: US 7,223,052 B1
(45) Date of Patent: May 29, 2007

(54) CONDUIT RETAINER APPARATUS

(76) Inventor: Daniel D. Evans, 3001 E. Cholla St., Phoenix, AZ (US) 85028

( * ) Notice: Subject to any disclaimer, the term of this patent is extended or adjusted under 35 U.S.C. 154(b) by 0 days.

(21) Appl. No.: 10/651,228

(22) Filed: Aug. 29, 2003

Related U.S. Application Data

(63) Continuation-in-part of application No. 10/058,950, filed on Apr. 22, 2002, now abandoned.

(51) Int. Cl.
*F16L 1/06* (2006.01)
*F16L 3/22* (2006.01)

(52) U.S. Cl. .................. 405/184.4; 248/68.1; 248/343; 248/216.1

(58) Field of Classification Search ................ 248/681, 248/343, 57, 216.1, 216.4, 217.3, 65, 67.5, 248/67.7; 405/184.4
See application file for complete search history.

(56) References Cited

U.S. PATENT DOCUMENTS

| | | | |
|---|---|---|---|
| 3,464,661 A | | 9/1969 | Alesi, Jr. |
| 3,518,421 A | * | 6/1970 | Cogdill ........................ 248/57 |
| 3,964,707 A | * | 6/1976 | Lewis ........................... 248/49 |
| 4,183,484 A | | 1/1980 | Mathews |
| 4,326,821 A | * | 4/1982 | Stefens ........................ 405/171 |
| 4,518,141 A | | 5/1985 | Parkin |
| 4,601,447 A | | 7/1986 | McFarland |
| 4,909,405 A | * | 3/1990 | Kerr, Jr. ....................... 220/3.9 |
| 5,102,074 A | * | 4/1992 | Okada .......................... 248/59 |
| 5,605,419 A | * | 2/1997 | Reinert, Sr. ............... 405/154.1 |
| 5,827,441 A | * | 10/1998 | Solbjorg ....................... 249/91 |
| 6,062,515 A | * | 5/2000 | Snyder ......................... 248/62 |
| 6,402,096 B1 | * | 6/2002 | Ismert et al. ............... 248/68.1 |
| 6,464,182 B1 | * | 10/2002 | Snyder ......................... 248/71 |
| 6,543,731 B1 | * | 4/2003 | Mercier ........................ 248/62 |

\* cited by examiner

*Primary Examiner*—Katherine Mitchell
(74) *Attorney, Agent, or Firm*—H. Gordon Shields

(57) ABSTRACT

Conduit retainer apparatus includes a central bridge element and a pair of end plates secured to the central bridge element. The conduit retainer apparatus is disposed in a trench on top of conduits. The end plates dig into the sides of the trench to prevent the conduits from rising or floating as the conduit is being encased in concrete. The end plates include barb elements to help lock the conduit apparatus to the sides of the trench. Different configurations of barb elements are illustrated, and also different embodiments of end plates and bridge elements.

20 Claims, 5 Drawing Sheets

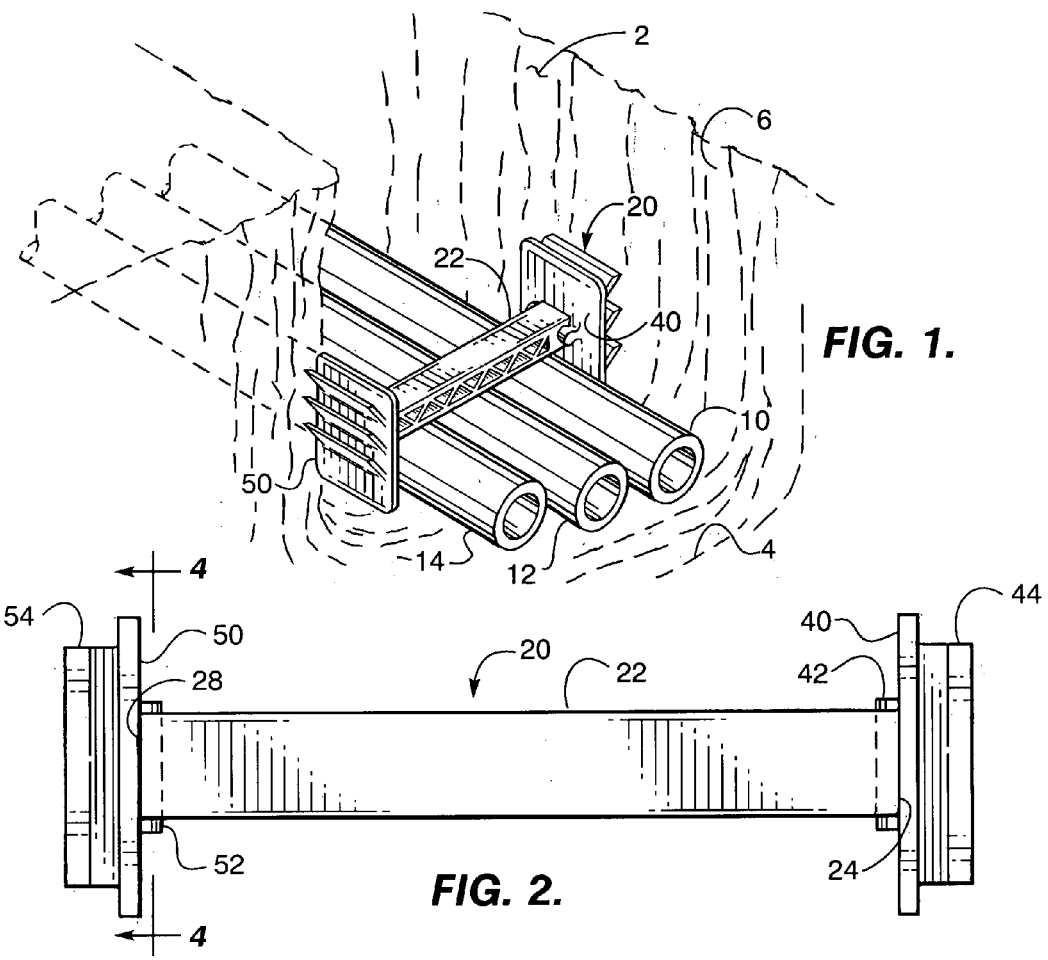
FIG. 1.
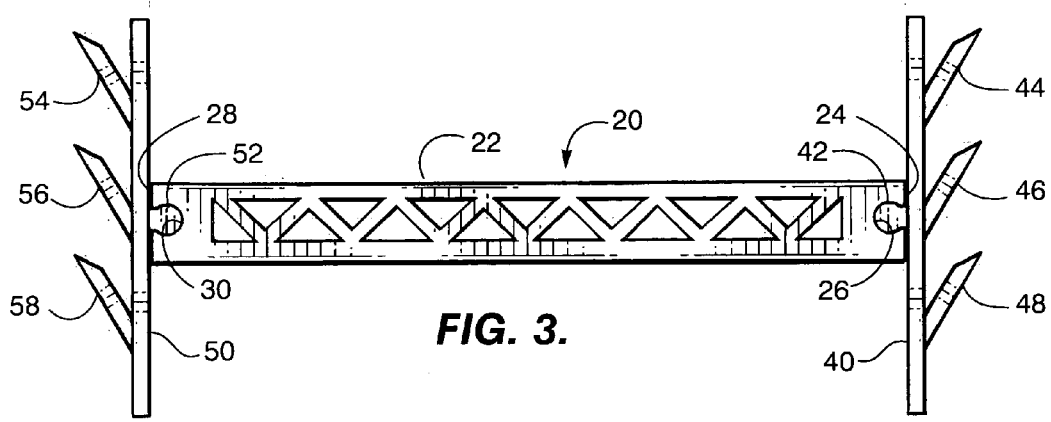
FIG. 2.
FIG. 3.

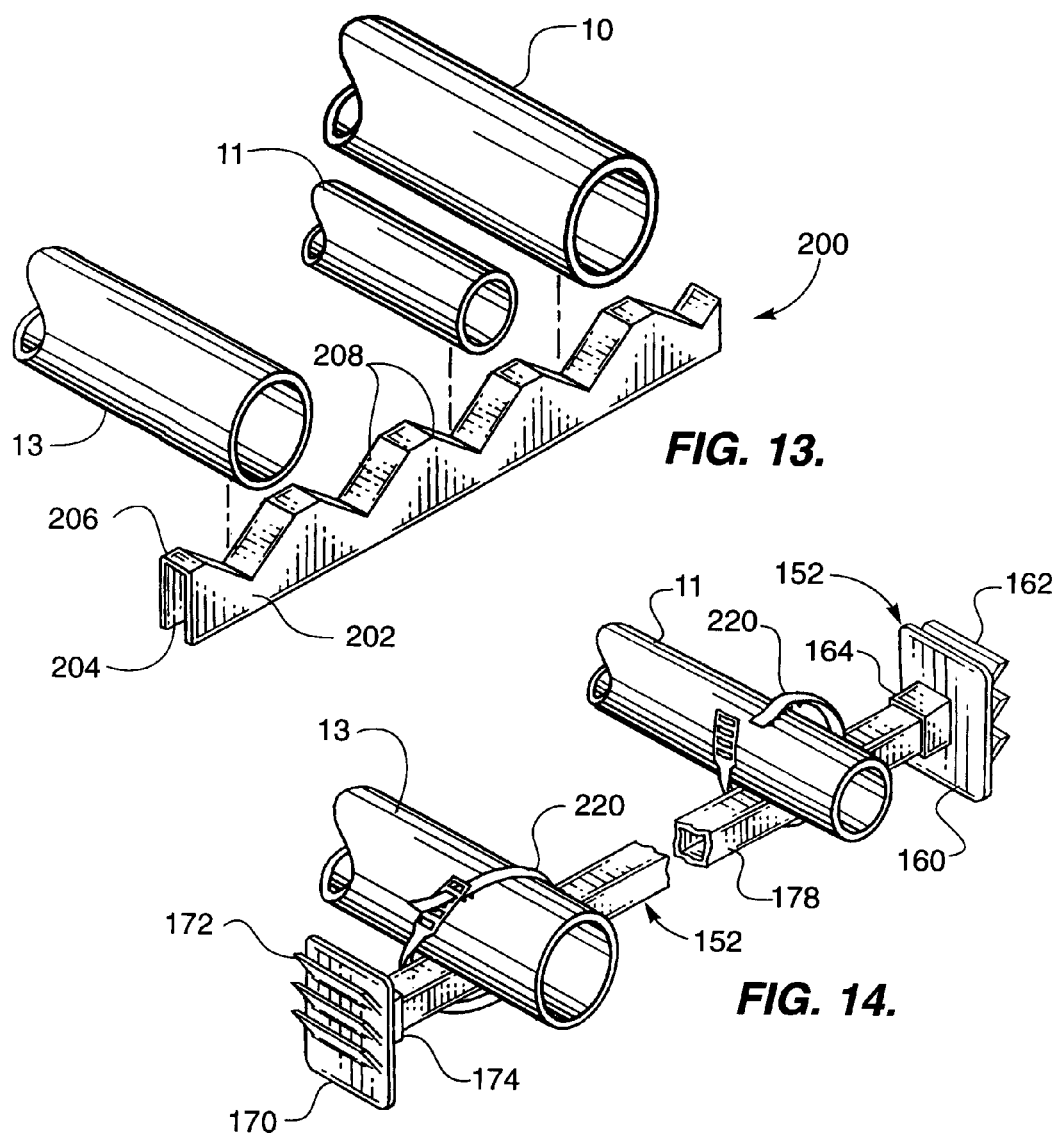

CONDUIT RETAINER APPARATUS

CROSS-REFERENCE TO RELATED APPLICATION

This application is a continuation-in-part of Ser. No. 10/058,950, filed Apr. 22, 2002 now abandoned.

BACKGROUND OF THE INVENTION

1. Field of the Invention

This invention relates to apparatus for holding conduit in a trench and, more particularly to apparatus disposed on top of conduits in a trench and extending between the sides of the trench.

2. Description of the Prior Art

In construction, trenches are dug to receive conduits. The conduits are used for different things, such as liquids (water), electrical conductors, etc. Typically, there are several conduits in a single trench. After the conduits are disposed in a trench, the trench is sometimes back filled with concrete. The conduits have a tendency to rise in the concrete as the concrete is being poured, and in order to prevent the conduits from rising, the conduits must be held in place in some manner.

In the prior art, the conduits are individually fastened in place in some manner or disposed in or on forms or "chairs" in a relatively time consuming and expensive manner. Typically, the use of forms also utilizes vertically oriented spikes to hold the forms in place. Such spikes are disliked by installers.

The following patents have been brought to the attention of the inventor:

U.S. Pat. No. 3,464,661 (Alesi, Jr.) discloses apparatus for supporting conduits in a trench. The conduit holding apparatus includes stackable forms for holding a plurality of conduits in spaced relation. The apparatus is held in place in a trench by vertically oriented spikes 33, as shown in FIGS. 1 and 2. The spikes have problems and the spike approach is not favored by installers. The present apparatus utilizes end plates to secure a horizontally extending element above the conduits to hold the conduits in a trench. The present apparatus may be used with the Alesi basic structure in place of the vertical spikes. The present apparatus is disposed above the top row of conduits to hold the conduits in the trench.

U.S. Pat. No. 4,183,484 (Mathews) discloses another type of conduit spacing apparatus. The apparatus is designed to hold conduits of different diameters in a trench. See FIG. 8. The apparatus also uses vertically oriented spikes for holding the apparatus in a trench, and is thus again not favored by installers. Again, the present apparatus may be used with the Mathews apparatus as discussed above.

U.S. Pat. No. 4,518,1414 (Parkin) discloses apparatus for supporting a fixture to a ceiling, such as a ceiling fan. The apparatus is secured between ceiling joists by joist-engaging blocks mounted on the ends of a threaded support member. The threaded support member thus expands upon the rotation of a center element to drive the spike ends of the blocks into the joists. This apparatus is completely unlike the present invention. The present invention utilizes a pair of end plates that are secured to the walls of a trench completely independently of the structure between the end plates.

U.S. Pat. No. 4,601,447 (McFarland) discloses a conduit spacing and anchoring apparatus which again utilizes vertically oriented spikes (rebar alements) to anchor the conduit holding elements in a trench. The apparatus is accordingly subject to the same deficiencies noted above for the apparatus which use such anchoring elements. Again, the present apparatus may be used with the McFarland structure to secure the conduits in a trench and thus overcome the vertical spike problems, as discussed above.

U.S. Pat. No. 5,827,441 (Solbjorg) discloses another type of conduit stacking and retaining apparatus. The elements which hold the conduits or pipes are secured to panels 8, as shown in FIGS. 1c, 1d, and 7. The conduit holding elements are not secured to the walls of the trench. The present invention may be used with the basic conduit or pipe holding elements to secure the conduits or pipes to the walls of the trench, thus obviating the requirement for the panels 8 and the elements 19 and their associated elements. See FIG. 7 and column 3, particularly lines 50–64.

None of the patents discussed above disclose or in any way suggest that conduits may be retained in place utilizing end plates which may be secured to the walls of a trench. In all cases, the present apparatus may be used with the conduit holding elements by being using the end plates secured to trench walls and then by placing the center bridge element over the conduits and securing the bridge element to the end plates.

The apparatus overcomes the deficiencies in the prior art by providing a retainer disposed on top of the conduits and extending between the sides of the trench. The retainers may be placed on the conduits in a spaced apart manner in the trench quickly and easily and the retainers are relatively inexpensive to manufacture.

SUMMARY OF THE INVENTION

The invention described and claimed herein comprises retainer apparatus comprised of a center bridge element disposed between a pair of end plates. The end plates include finger elements which dig into the walls of the trench to prevent the bridge from coming loose while concrete is being poured into the trench and around the conduit. With the bridge loose, the conduit may float upwardly in the trench. The retainer apparatus is placed on top of conduits which are typically disposed on chairs in the trench and the apparatus remains in place in the trench. Several embodiments of end plates are disclosed.

Among the objects of the present invention are the following:

To provide new and useful conduit retainer apparatus;

To provide new and useful apparatus for retaining conduits in trenches;

To provide new and useful conduit retainer apparatus including a central bridge element and a pair of end plates;

To provide new and useful conduit retainer apparatus having three elements, a center bridge element and two end plates;

To provide new and useful conduit retainer apparatus including a pair of end plates having apertures for receiving dowels;

To provide new and useful apparatus for holding conduits in a trench, with the apparatus including a central bridge portion and a pair of end plates having retainer elements extending upwardly and outwardly from the end plates to hold the apparatus in a trench; and To provide new and useful apparatus having three elements easily manufactured and assembled and made of relatively inexpensive material.

BRIEF DESCRIPTION OF THE DRAWING

FIG. 1 is a perspective view of the apparatus of the present invention in its use environment.

FIG. 2 is a top view of the apparatus of the present invention.

FIG. 3 is a side view of the apparatus of the present invention.

FIG. 13 is a view in partial section of another alternate embodiment of the apparatus of the present invention.

FIG. 14 is a perspective view of another alternate embodiment of the apparatus of the present invention.

DESCRIPTION OF THE PREFERRED EMBODIMENT

Figure 4:
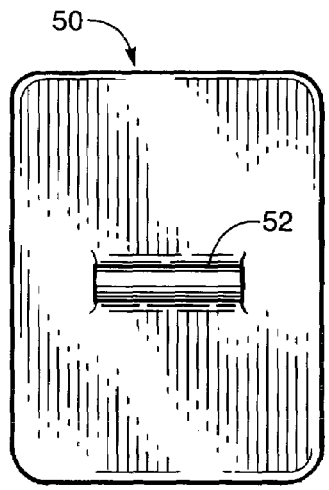
FIG. 4 is a view taken generally along line 4—4 of FIG. 3.

FIG. 1 is a perspective view of a trench 2 with three conduits 10, 12, and 14 disposed on a trench bottom 4. The trench includes a pair of sides, of which a side 6 is plainly shown in FIG. 1. A portion of the trench is cut away to show features of a conduit retainer apparatus 20 disposed in the trench 2 on the three conduits 10, 12, and 14. It will be noted that conduits are typically disposed on "chairs" in a trench when the conduits are to be encased in concrete. Such chairs are not shown in the drawing Figures, but are referred to in conjunctions with some of the prior art patents discussed above in the "Description of the Prior Art" portion hereof.

FIG. 2 is a top view of the conduit retainer apparatus 20, and FIG. 3 is a side view of the conduit retainer apparatus 20. The conduit retainer apparatus 20 includes a center bridge portion 22 to which are secured two end plates, an end plate 40 and an end plate 50. FIG. 4 is a view of the end plate 50 taken generally along line 4—4 of FIG. 2. For the following discussion, reference will be made to FIGS. 1, 2, 3, and 4.

The conduit retainer apparatus 20 may be fabricated in three pieces, including the center bridge portion 22 and two end plates 40 and 50. The end plates 40 and 50 are generally identical to each other.

Figure 5:
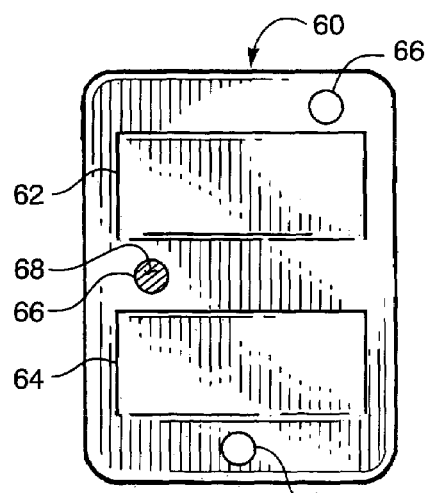
FIG. 5 is an end view of an alternate embodiment of a portion of the present invention.

The center bridge portion 22 may be molded of appropriate plastic material, and the end plates 40 and 50 are similarly molded of appropriate plastic material. The center bridge 22 includes a pair of ends 24 and 28, and each end includes a recess. The end 24 includes a recess 26 and the end 28 includes a recess 30. The end plates, as best shown in FIGS. 4 and 5, are of a generally rectangular configuration.

On one side of the end plates there is a locking element and on the opposite side of the end plates from the locking element are two or three upwardly extending barbs or louvers. The end plate 40 includes a locking element 42 which extends into the recess 26 of the end 24 of the center bridge 22. The end plate 40 includes three upwardly extending barbs or tabs 44, 46, and 48. The barbs or tabs 44, 46, and 48 are generally of rectangular configuration. The barbs extend outwardly and upwardly with respect to the end plate 40 so as to engage the wall 6 of the trench 2, as illustrated in FIG. 1. The apparatus 20 may be relatively easily inserted into the trench 2, but the outwardly and upwardly orientation of the barbs or tabs resists the upward movement of the apparatus when the conduit is encased in the concrete.

The end plate 50 is substantially identical to the end plate 40. It includes a locking element 52 on one side of the end plate and three barbs or tabs 54, 56, and 58 on the opposite side of the end plate from the locking element 52. The locking element 52 extends into the recess 30 on the end 28 of the center bridge 22. The barbs 54, 56, and 58 extend generally outwardly and upwardly so as to engage the opposite side of the trench 4 from the side 6.

As shown in FIG. 1, a portion of the trench 2 has been cut away to illustrate how the barbs 54, 56, and 58 dig into the side. With the barbs or louvers 44, 46, and 48 and 54, 56, and 58 digging into the sides of the trench, the retainer apparatus 20 is essentially locked into the trench 2 on top of the conduits 10, 12, and 14. Thus, as the conduit is encased in/with concrete, the conduit retainer apparatus 20 holds the conduits 10, 12, and 14 downwardly on the bottom 4 of the trench 2 and prevents the conduits from rising upwardly, or floating upwardly, as the conduit is encased.

FIG. 5 is an end view of an alternate embodiment of an end plate usable with the apparatus of the present invention.

In FIG. 5, an end plate 60 is shown as having a generally rectangular configuration, as discussed above. The end plate 60 includes only two louvers, a louver 62 and a louver 64. In addition to the louvers, the end plate 60 also includes three apertures 66 which extend through the end plate. The apertures 66 receive spikes or dowels, of which a shank 68 is shown extending through one of the apertures 66 in FIG. 5. When a trench is dug in non-cohesive soil, such as sandy soil, then conduit retainer apparatus use end plates with holes for pointed dowels or spikes. In such case, there generally may only be two louvers, and a plurality of holes, such as the three shown in FIG. 5. The pointed dowels or spikes extend through the holes in the end plate and are long enough to extend a substantial distance into the sides of the non-cohesive soil of the trench to help anchor the end plates and thus the conduit retainer apparatus to the sides of the trench. Obviously, the end plates for such non-cohesive soil may be larger than normal, and the end plates may accordingly incorporate more than the two louvers illustrated in FIG. 5.

Figure 6:
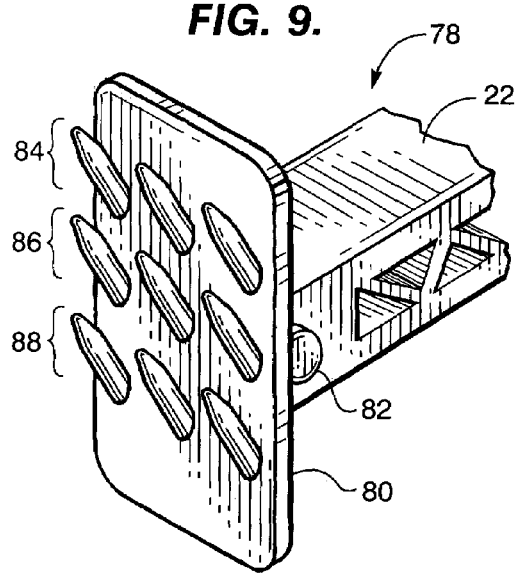
FIG. 6 is a perspective view of an alternate embodiment of a portion of the apparatus of the present invention.

FIG. 6 is a perspective view of an alternate embodiment of the apparatus 20 illustrating a different type of end plate, or rather different types of barbs on an end plate. For the following discussion, reference will primarily be made to FIG. 6.

Conduit retainer apparatus 70 of FIG. 6 includes a center bridge element 22, as described above, with a pair of end plates 80 secured thereto. One end plate 80 is illustrated in FIG. 6. The end plate 80 is of a generally rectangular configuration, substantially identical to the general configuration of the end plates 40 and 50, discussed above. On one side of the end plate 80 is a locking element 82 which extends into the recess 30 on the center bridge element 22. (See FIG. 3) On the opposite side of the end plate 80 from the locking element 82 are three rows of barbs, including an upper row of barbs 84, a middle row of barbs 86, and a bottom row of barbs 88. The barbs 84, 86, and 88 generally extend outwardly and upwardly from the end plate 80. The barbs 84, 86, and 88 are substantially identical to each other, and each terminates in a generally pointed tip. The barbs 84, 86, and 88 are appropriately spaced apart from each other for maximum efficiency in locking the conduit retainer apparatus 70 to the sides of the trench.

As the conduit retainer apparatus 20 or 70 is disposed in a trench 2, and moved downwardly on top of conduits, the barbs or tabs dig into the sides of the trench to prevent the retainer apparatus from rising in the trench as the conduit is incased. Thus, the conduits are held or are retained in place in the bottom of the trench 2 during the backfill operation and conduit encasement.

The center bridge elements may be easily manufactured in virtually any length, as appropriate for the size of the trench in which the elements will be disposed. Thus, they may be relatively short, for a narrow trench, or larger, depending on the circumstances. The end plated are substantially identical, and there are accordingly no "right" or "left" end plates. All of the end plates will fit onto both ends of a bridge element. The bridge elements and the end plates may be easily molded of appropriate plastic material and need only be strong enough to hold the conduits in place until the concrete encasement of the trenches begins to harden. Thus, they need not be expensive or "permanent" in nature.

Two different configurations of end plates have been shown, and obviously there may be more. The end plates include barb elements extending outwardly and inwardly to allow a retainer to be easily moved down into a trench, but resist upward movement in the trench.

Figure 7:
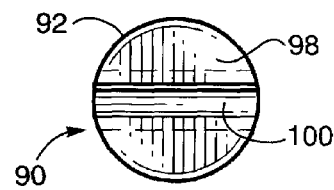
FIG. 7 is an end view of an alternate embodiment of a portion of the apparatus of the present invention.

FIG. 7 is an end view of an alternate embodiment retainer apparatus 90 showing a different configuration of a bridge portion 92 of the retainer apparatus 90. The general configuration of the center bridge portion 92 is circular. The bridge portion 92 includes an end 98 and a recess 100 extends into the end 98 for receiving a locking element of an end plate.

Figure 8:
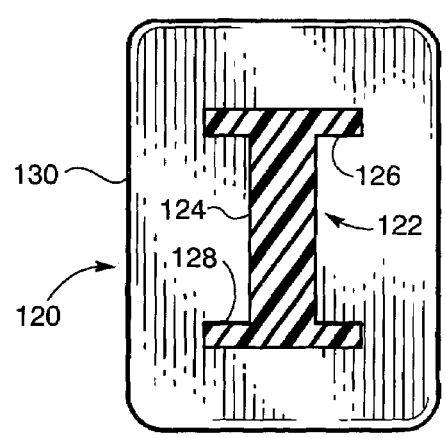
FIG. 8 is a view in partial section through another alternate embodiment of a portion of the apparatus of the present invention.

In FIG. 8, another configuration for a center bridge portion 22 of a retainer apparatus 120 is illustrated. Again, the configuration of the center bridge portion 122 is different from that illustrated in FIG. 7 and in FIGS. 1, 2, 3, and 6. The configuration of the center bridge portion 122 of the retainer apparatus 120 is generally that of an "I-beam" with a center web 124, a top flange 126, and a bottom flange 128. The thickness of the center web 124 is somewhat thicker than a typical I-beam configuration, at least adjacent to the outer ends at the end plates.

An end plate 130 is shown integrally with the bridge 122. Thus, the apparatus 120 may be molded as a single piece, rather than separate bridges and end plates.

It is obvious that there may be other configurations of center bridge portions than the three illustrated. However, the apparatus includes a center bridge portion and end plates which are disposed against the walls of a trench. The bridge portion is disposed on top of conduits for retaining conduits in a trench as the conduit is being encased. The elements may be molded of plastic or any other appropriate material, and they may be molded in one piece, if desired, as illustrated in FIG. 8, or they may be molded in two pieces, a center bridge portion and an end plate, with two ends plates, interchangeable, as discussed above in conjunction with FIGS. 1–7, secured to opposite ends of the center bridge portion.

The advantage of having a bridge portion molded separately from the end plates is simply that bridge portions of different lengths may be molded and secured to end plates to cover the width of virtually any trench. On the other hand, economics of manufacture and ease of use in not requiring assembly provide advantage for a single molded element.

In some construction situations, a trench may include conduits as shown in FIG. 1, on the bottom of the trench, and the trench may be only partially backfilled with concrete. In the partially backfilled trench, more conduits may be disposed. However, in this situation retainer elements may be used in the reverse of that illustrated in FIG. 1. That is, a retainer element 20 may be inserted into a trench upside down or inverted at a specific depth by slightly bending the central bridge portion 22 to reduce the overall length of the element. At the desired depth, the element may be released, with the barbs or tabs now extending downwardly, the element 20 may not be pushed or moved any farther downwardly.

With a plurality of such integrated elements, conduit(s) may be disposed on the center bridge portions and thus located at a very specific depth. The backfilling of the trench may now be completed with dirt, as opposed to concrete.

The retainer apparatus 20 now acts as a support element for a conduit or a plurality of conduits. Again, the retainer elements, now inverted, may be spaced apart a desired distance from each other.

In the preceding example, dirt has been discussed for completing the backfill. It is obvious that additional retainer elements may be used in their conventional (original) orientation on the second layer of conduits if it is desired to complete the backfill with concrete.

Figure 9:
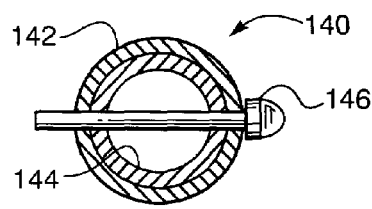
FIG. 9 is a view in partial section through another alternate embodiment of the present invention.

FIG. 9 is a view in partial section through a bridge portion of a retainer apparatus 140. The apparatus 140 includes two telescoping bridge members 142 and 144. The bridge member 142 is an outer tubular member and the bridge member 144 is an inner tubular member. The two members 142 and 144 are locked or secured relative to each other by a pin 146. The pin 146 extends generally horizontally through aligned holes or apertures in the bridge members 142 and 144. The two telescoping members may be used to bridge trenches of varying widths.

Preferably, the outer member 142 includes only a single pair of aligned holes or apertures, while the inner member 144 includes a plurality of spaced apart aligned holes or apertures to allow a single retainer to fit into trenches of varying widths. Thus, when the retainer apparatus is disposed in a trench, the members 142 and 144 are extended outwardly until their end plates (not shown) contact the sides or walls of the trench. The pin 146 is then inserted into appropriately aligned holes or apertures to lock to two bridge portions together.

While the cross section of the bridge elements 142 and 144 is shown a circular or round, as in FIG. 7, it is obvious that other cross sectional configurations may also be used, such as rectangular, square, or triangular, etc. Moreover, it is also obvious that a one way ratcheting type interlocking arrangement (not shown) may be used to secure the two telescoping elements together, or some other type of locking arrangement may be used. Such locking arrangements are well known and understood.

Figure 10:
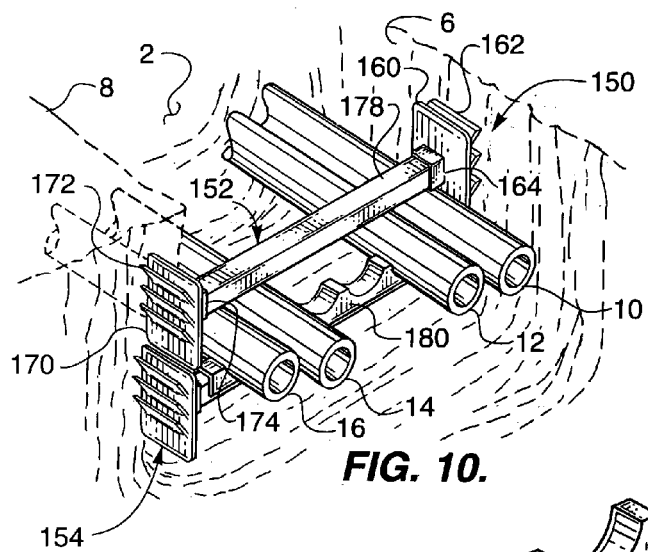
FIG. 10 is a perspective view of an alternate embodiment of the apparatus of the present invention in its use environment.
Figure 11:
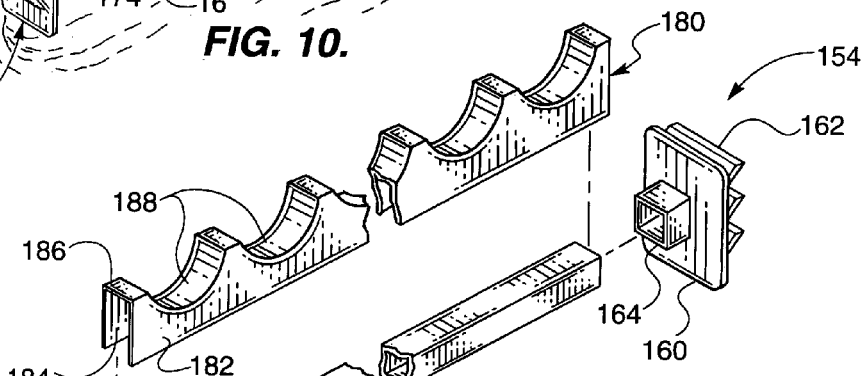
FIG. 11 is a perspective view of the apparatus of FIG. 10.
Figure 12:
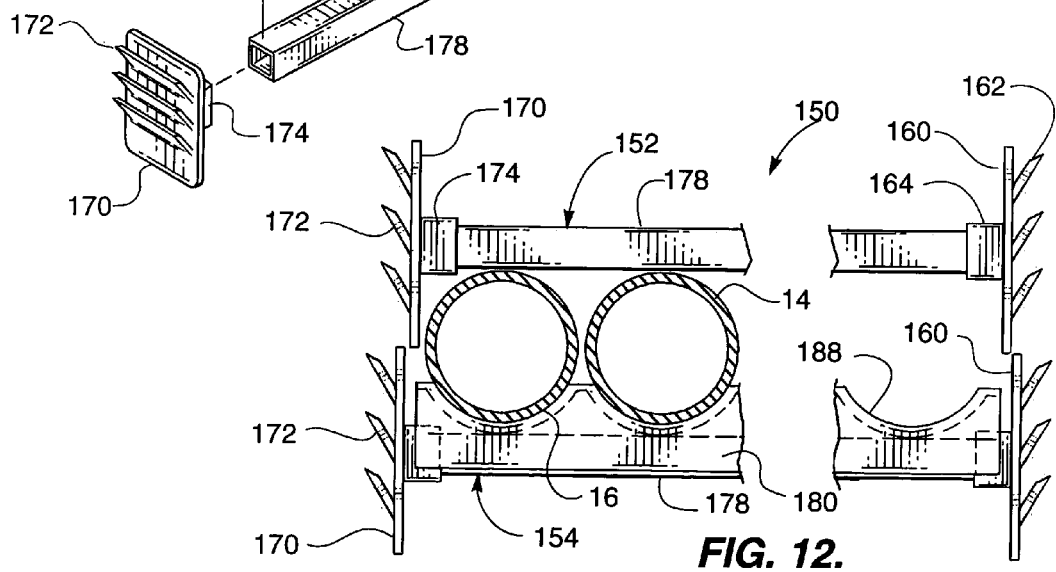
FIG. 12 is an end view in partial section of the apparatus shown in FIG. 10.

FIG. 10 is a perspective view of conduit retainer apparatus 150, which comprises another alternate embodiment of the apparatus of the present invention. FIG. 11 is an exploded perspective view of a lower bridge assembly 154, and FIG. 12 is an end view, in partial section, of the apparatus of the conduit retainer apparatus 150, showing a pair of conduits 14 and 16 disposed on the lower bridge assembly 154 and held in place by an upper bridge assembly 152. For the following discussion, reference will be made to FIGS. 10, 11, and 12.

The conduit retainer apparatus 150 is disposed in a trench 2, and extends between a pair of sides 6 and 8 and above a bottom 4. The conduit retainer apparatus 150 includes a pair of bridge assemblies, including a generally rectangular central upper bridge assembly 152 and a generally rectangularly configured lower bridge assembly 154. The two bridge assemblies 152 and 154 are disposed immediately adjacent to each other, with four conduits 10, 12, 14, and 16 disposed there between. The conduits are essentially disposed on the lower bridge assembly 154, and the upper bridge assembly 152 is on top of the conduits to hold them in place in the trench 2.

The upper bridge assembly 152 includes a pair of end plates 160 and 170, which are substantially identical to each other. The end plate 160 includes three rows of barb tabs 162 extending outwardly from the plate 160 and in to the side wall 6 of the trench 2. On the opposite side of the plate 160, remote from the barb tabs 162, is a generally rectangular socket 164.

The end plate 170 is substantially identical to the end plate 160, it is also of a generally rectangular configuration and includes three rows of barb tabs 172 extending outwardly into the side 8 of the trench 2. On the opposite side of the end plate from the barb tabs 172 is a rectangular socket 174. A center rectangular bridge 178 is disposed between the end plates 160 and 170 and extends into the sockets 164 and 174.

The lower bridge assembly 154 is substantially identical to the upper bridge assembly 152. It includes a pair of end plates 160 and 170, with their respective barb tabs 162 and 172 and their sockets 164 and 174. The center rectangular bridge 178 extends into the sockets 164 and 174. However, the lower bridge assembly 154 also includes a conduit form 180 which is disposed on the center bridge 178. The conduit form 180 includes a pair of sides 182 and 184 which are spaced apart from each other essentially the width of the bridge 178. Secured to the sides 182 and 184 is a top 186. The top 186 includes a plurality of space apart scallops 188 the conduits 10, 12, 14, and 16 are disposed on the scallops 188.

The conduit form 180, with its scallops 188, allows the conduit elements to be essentially nested and held in place in a spaced apart relationship. This is best shown in FIG. 12.

It will also be noted that the square configuration of the sockets 164 and 174 may also be used with a round bridge element. Such round bridge element, as shown below in FIG. 15. Such round bridge element may either fit into the socket or about the socket.

FIG. 13 is a view in partial section of an alternate conduit form 200, with three conduits 10, 11, and 14 disposed above the conduit form 200. Essentially, the conduit form 200 is an alternate embodiment of the conduit form 180 of FIGS. 10, 11, and 12.

The conduit form 200 includes a pair of sides 202 and 204, spaced apart from each other and generally parallel to each other. Secured to the sides 202 and 204 is a top 206. The top includes a plurality of spaced apart vee shaped grooves 208.

Above three of the vee shaped grooves 208 are three conduits, including conduits 10, 11, and 13. It will be noted that the conduits 10, 11, and 13 are each of a different diameter. In FIGS. 1, 10, and 12, the conduits are all of the same size or diameter, while the conduits 10, 11, and 13 are each of different diameters. The vee shaped grooves 208 of the conduit form 200 receive different diameter conduits and nest them more conveniently than do the curved scallops 188 of the conduit form 180, discussed above. Thus, there may be advantages, of using a conduit form 200 as opposed to the conduit form 180.

FIG. 14 is a perspective view showing an alternate method of securing conduits to a central bridge. A pair of conduits 11 and 13, having different diameters from each other, are shown secured to a central bridge 178 by a pair of straps or ties 220. The bridge 178 extends between a pair of end plates 160 and 170. The end plates 160 and 170 and the central bridge 178 comprise essentially the bridge assembly 152, discussed above in conjunction with FIGS. 10, 11, and 12.

The straps or ties 220 are essentially plastic elements typically employed for a myriad of uses for securing together bundles of wires, etc. A tie 220 is simply disposed about a conduit and around the bridge 178 to secure a conduit to the bridge.

Figure 15:
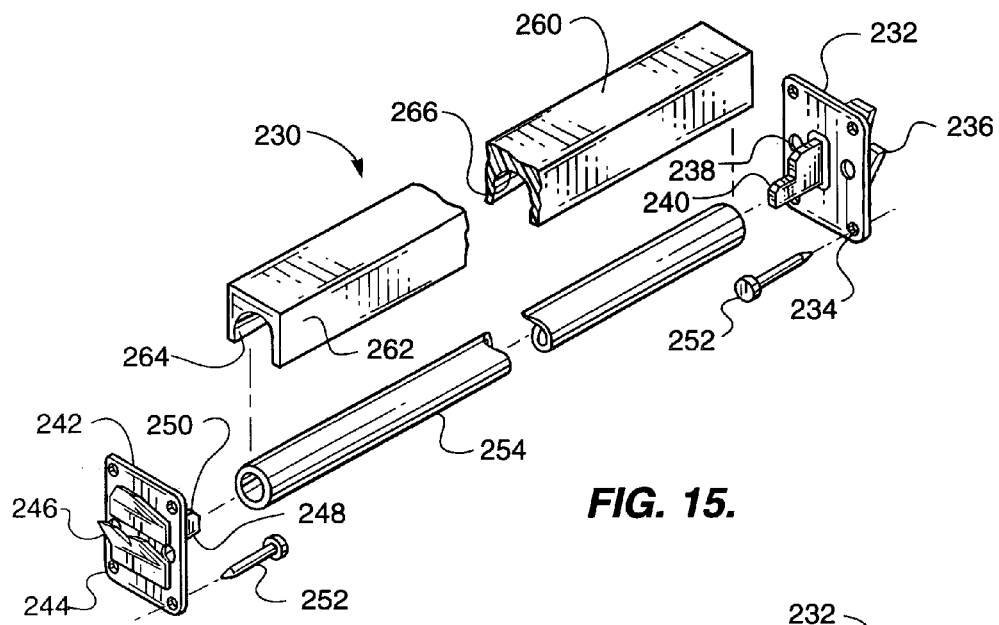
FIG. 15 is an exploded perspective view, in partial section, of another alternated embodiment of the apparatus of the present invention.

FIG. 15 comprises an exploded perspective view of an alternate bridge assembly 230, and FIG. 15 is a side view of a portion of the bridge assembly 230. For the following discussion, reference will primarily be made to FIGS. 15 and 16.

The bridge assembly 230 is an alternate embodiment of the bridge assembly 150 shown in FIGS. 10, 11, and 12, and discussed in conjunction therewith. The bridge assembly 230 includes a pair of spaced apart end plates 232 and 242 and a central bridge element 254. As with the other embodiments discussed above, the end plates 232 and 242 are substantially identical. The central bridge 254, however, is of circular cross sectional configuration. That is, the bridge element 254 essentially is a piece of pipe. While the bridge element 254 is shown as a one piece element, it is obvious that it could be a two piece element, such as the telescoping element 140 discussed above in conjunction with FIG. 9. In the alternative, of course, it could also be a square or rectangular bridge element also telescoping, if desired.

The end plate 232 includes four spaced apart apertures of holes 234 disposed adjacent to the four corners of the rectangularly or squarely configured end plate 232. The apertures or holes receive pins or nails 252 to help secure the end plate 232 to the wall of a trench. The end plate 232 also includes barbed tabs 236 which help to dig into the walls of a trench. On the opposite side of the end plate 232 from the barb tabs 236 is a boss 238. The boss 238 includes a step 240.

As indicated above, the end plate 242 is substantially identical to the end plate 232. The end plate 242 is also of a square or rectangular configuration with four holes or apertures 244 located adjacent to the corners of the end plate. On the outer side of the end plate 242 are barb tabs 246. On the opposite side, the inner side, of the end plate 242 is a boss 248. The boss 248 includes a step 250.

The round bridge 254 is disposed on the steps 240 and 250, while a conduit form 260 is disposed on the top of the bosses 238 and 248. The conduit form 260, best shown in FIG. 15, has an overall rectangular configuration, including a pair of spaced apart side walls 262 and 264. The upper interior of the conduit form 260 includes a circular top 266 to match the circular, rounded portions of the bosses 238 and 248 as well as the circular configuration of the bridge 254. Thus, if the length of the conduit form 260 is less than the distance between the bosses 238 and 248 in a trench, the form 260 may be disposed directly on the cylindrical bridge 254.

In turn, a conduit, or a plurality of conduits, may be disposed on the top of the conduit form 260 in a trench or directly on top of the bridge 254. To hold the conduits in place, another bridge assembly or element, without a conduit form, is then disposed in the trench on top of the conduits, with the conduits disposed between the two bridge assemblies, such as illustrated in FIGS. 10 and 12.

Obviously, a scalloped or vee-shaped element, such as shown in FIGS. 11, 12, and 13, may also be used in place of the form 260.

Figure 16:
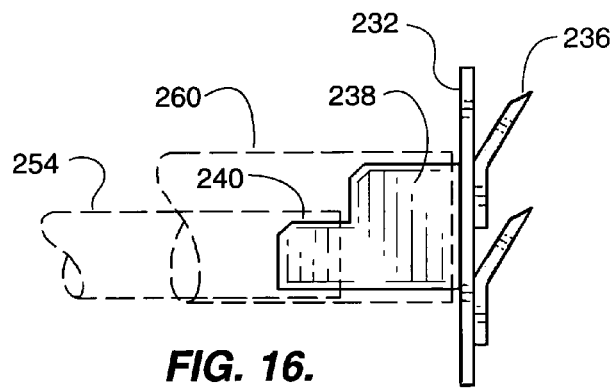
FIG. 16 is a side view of a portion of the apparatus of FIG. 15.
Figure 17:
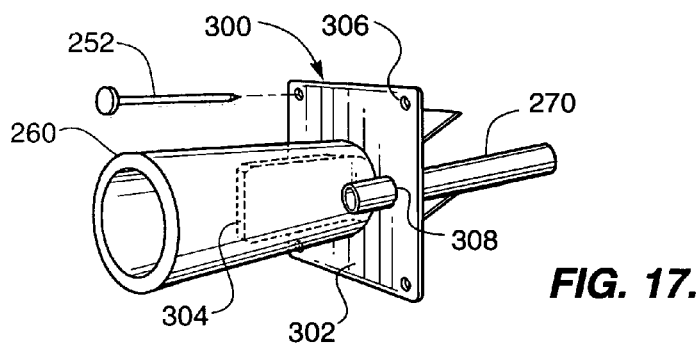
FIG. 17 is a perspective view of an alternate embodiment of the end plate shown in FIG. 16.

FIG. 17 is a perspective view of an alternate embodiment of the apparatus 230 of FIGS. 15 and 16, with an alternate embodiment end plate 300. The end plate 300 may be advantageous in a trench in sandy terrain. The end plate 300 includes a generally square or rectangular base plate 302 with a generally rectangular boss 304 extending outwardly from the base plate 302. There are four holes or apertures 306 adjacent to the four corners of the base plate 302. The four holes 306 receive pins or nails 252, as shown for the base plate 232 in FIG. 15.

On opposite sides of the boss 304 are relatively large apertures or holes 308 which receive relatively long fastener elements 270, which may be pieces of conduit pipe or the like. In situations of relatively loose or sandy soil, the use of nails or pins 252 may not be sufficient to secure an end plate to a wall of a trench, and accordingly a longer fastening element, such as the fastener element 270, may be required. Thus, a pair of such fastening elements 270, one on each side of the boss 304 extending through the apertures 308, may provide the necessary stability for the plate 300 on the walls of a trench having non-cohesive soil, such as sandy soil. The length of the relatively long fastening elements 270 depends generally on the cohesiveness of the soil. Obviously, less cohesive the soil, the longer the fastening elements should be.

The round bridge element 260 is shown disposed on the boss 304. The bridge element 260 extends across a trench to another end plate 300, as may be understood, as discussed above for the prior embodiments.

Where conduits need to be disposed at a particular depth in a trench, or laid out in a particular arrangement, a conduit form or a tie arrangement, such as illustrated in FIGS. 10–16 may be desirable. In other situations, a simple bridge assembly such as shown in FIGS. 1–9 may be satisfactory. Whatever the circumstances, the conduit retainer apparatus of the present invention, in any of the several combinations as appropriate, may be employed to hold conduits in a trench while the trench is backfilled.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

I claim:

1. Retainer apparatus for holding conduits in a trench having a bottom and a pair of sides comprising in combination:
    a center bridge portion to be disposed against the conduits in the trench and;
    a pair of end plates secured to the center bridge portion and disposed against the sides of the trench
    a boss on each end plate extending outwardly from the end plates for receiving the bridge; and
    means for securing the end plates to the sides of the trench said means comprising barbs extending outwardly and upwardly, from the end plates.

2. The apparatus of claim 1 in which the barbs are in the configuration of louvers.

3. The apparatus of claim 2 in which the barbs are disposed generally parallel to each other.

4. The apparatus of claim 1 in which the end plates are generally of a rectangular configuration.

5. The apparatus of claim 1 in which the end plates include apertures.

6. The apparatus of claim 5 which includes spikes extending through the apertures for anchoring the end plates in non-cohesive soil.

7. The apparatus of claim 1 in which the center bridge portion comprises a single member.

8. The apparatus of claim 7 in which the center bridge portion has a generally circular cross section when viewed at a cut perpendicular to the longitudinal axis.

9. The apparatus of claim 1 in which the trench includes non-cohesive soil and the means for securing the pair of end plates to the sides of the trench includes apertures in the end plates and relatively long fastening elements extending through the apertures and into the non-cohesive soil.

10. The apparatus of claim 1 in which the center bridge portion has a generally rectangular cross section when viewed at a cut perpendicular to the longitudinal axis.

11. The apparatus of claim 1 in which the center bridge portion comprises an upper flange portion, a lower flange portion, and a webbed section between said upper and lower flange portions.

12. The apparatus of claim 1, wherein the end plates and center bridge are integrally formed as a single unit.

13. The apparatus of claim 1, wherein the end plates and center bridge are separately formed and are assembled to form the retainer apparatus, each of said end plate bosses capable of receiving either end of said center bridge.

14. End plate apparatus to be secured to a wall of a trench for retaining at least a single conduit in the trench comprising in combination:
    an end plate having at least a single barb element extending upwardly and outwardly from the end plate and adapted to extend into the wall of the trench;
    a boss extending outwardly from the end plate opposite to the barb element and adapted to receive a bridge element to be disposed on at least the single conduit disposed in the trench; and
    means for securing the end plate to the wall of the trench.

15. The apparatus of claim 14 in which the means for securing the end plate to the wall of the trench includes at least a single aperture extending through the end plate for receiving a spike.

16. The apparatus of claim 14 in which the at least single barb element is in the configuration of a louver.

17. A method of retaining conduits in a trench having a bottom and a pair of walls comprising the steps of:
   providing a pair of end plates including providing at least one barb element extending upwardly and outwardly from each respective end plate;
   securing the end plates to the walls of the trench adjacent to the conduits;
   providing a bridge element;
   placing the bridge element over the conduits; and
   securing the bridge element to the end plates.

18. The method of claim 17 in which the step of providing a pair of end plates includes the step of providing a boss on each end plate to receive the bridge element.

19. The method of claim 17 in which the barb elements are in the configuration of a louver.

20. The method of claim 17, wherein the length of the bridge element placed on the pair of end plates, in combination with the pair of end plates, is selected to correspond to the width of the trench.

* * * * *